US008409648B2

(12) United States Patent
Anderson et al.

(10) Patent No.: US 8,409,648 B2
(45) Date of Patent: Apr. 2, 2013

(54) MACHINE AND METHOD FOR CONTROLLING THE TEMPERATURE OF DOUGH

(75) Inventors: Rick Anderson, Waterville, OH (US); Tim Hancock, Malinta, OH (US); Mukul Mehta, Westlake, OH (US)

(73) Assignee: Anderson Group, Ltd., Waterville, OH (US)

( * ) Notice: Subject to any disclaimer, the term of this patent is extended or adjusted under 35 U.S.C. 154(b) by 208 days.

(21) Appl. No.: 12/856,231

(22) Filed: Aug. 13, 2010

(65) Prior Publication Data

US 2012/0040069 A1 Feb. 16, 2012

(51) Int. Cl.
*A23L 1/025* (2006.01)

(52) U.S. Cl. ........ 426/446; 426/455; 426/456; 426/458; 210/85; 210/739

(58) Field of Classification Search .................. 426/446, 426/455, 456, 458; 210/739, 85
See application file for complete search history.

(56) References Cited

U.S. PATENT DOCUMENTS

| | | | |
|---|---|---|---|
| 2,099,937 A | 11/1937 | Lauterbur | |
| 2,370,888 A | 3/1945 | Sticelber | |
| 3,881,404 A | 5/1975 | Ohkawa | |
| 3,928,646 A | 12/1975 | Hartley | |
| 4,438,146 A | 3/1984 | Colby et al. | |
| 4,490,046 A | 12/1984 | Guibert | |
| 4,501,757 A | 2/1985 | Smith et al. | |
| 5,171,590 A | 12/1992 | Sluimer | |
| 5,272,962 A | 12/1993 | Kageyama et al. | |
| 6,143,183 A * | 11/2000 | Wardwell et al. | 210/739 |
| 6,503,550 B1 | 1/2003 | Suganuma et al. | |
| 6,883,685 B2 * | 4/2005 | Jones et al. | 222/146.5 |
| 7,380,518 B2 * | 6/2008 | Kates | 119/72 |
| 2009/0220643 A1 | 9/2009 | Kato | |

FOREIGN PATENT DOCUMENTS

WO WO-2004010786 2/2004

* cited by examiner

*Primary Examiner* — Helen F Heggestad
(74) *Attorney, Agent, or Firm* — Gifford, Krass, Sprinkle, Anderson & Citkowski, P.C.

(57) ABSTRACT

A machine and method operable to mass produce batches of dough in selectable, discrete and customizable batches and control the temperature of the dough under various environmental conditions is provided. The machine and method adjusts the temperature of the water introduced into a batch of dough in order to make a batch of dough having a predetermined temperature. Specifically, the machine includes a controller operable to adjust the temperature of the water based upon first law of thermodynamics to produce a batch of dough having a predetermined temperature. The machine includes a bowl for containing dough ingredients, a water source operable to selectively introduce water with the dough ingredients, a controller, and a water temperature controlling apparatus. The controller actuates the water temperature controlling apparatus to change the temperature of the water introduced into the bowl so as to form a batch of dough having a predetermined temperature.

22 Claims, 3 Drawing Sheets

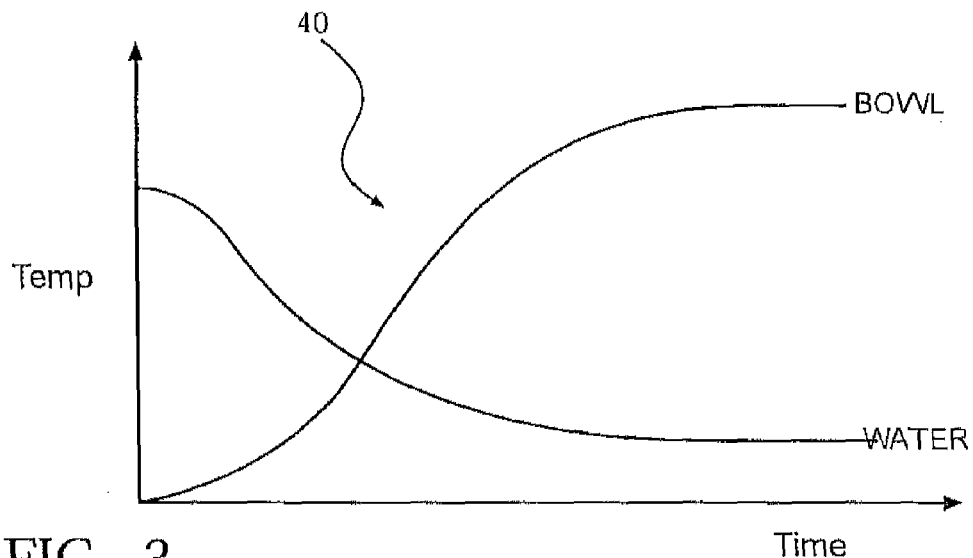
FIG. 3
FIG. 4
A method for producing a batch of dough
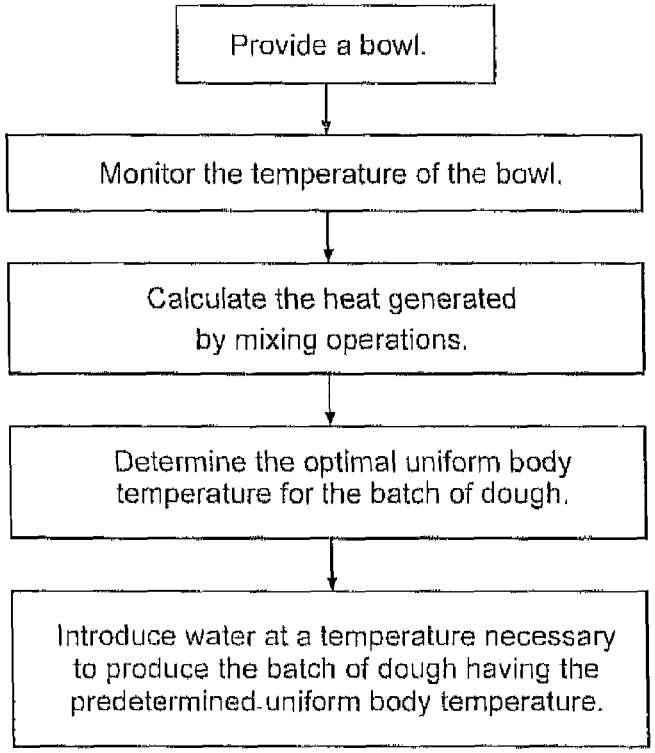

MACHINE AND METHOD FOR CONTROLLING THE TEMPERATURE OF DOUGH

BACKGROUND OF THE INVENTION

1. Field of the Invention

A machine for producing a batch of dough having a predetermined temperature is provided.

2. Description of the Prior Art

Dough preparation is a labor-intensive operation and requires many specific environmental conditions to be met. It is known that dough temperature facilitates the reaction of yeast. Specifically, the proofing time for dough can be optimized by maintaining the dough at an optimal temperature for yeast reaction. For instance, it is known that some forms of yeast remain inactive under 76 degrees Fahrenheit, and that yeast reaction is commonly optimized when maintained at a temperature between 78 and 82 degrees Fahrenheit. Thus, proofing time will vary between batches if dough temperature is not controlled. Accordingly, the mass production of dough requires a controlled environment. This helps ensure that the temperature of each batch of dough remains at a predetermined and desirable range so that the production of dough results in a consistent texture and quality beginning from the first batch of the day to the last batch of the day.

Perhaps the greatest variance in dough temperature results from the bowl in which the ingredients are mixed. Such bowls are often huge containers made of stainless steel. These containers act as a "heat sink," meaning the containers store a lot of heat. The heat may be generated from the operation of adjacent ovens, or actual mixing operations. This heat is then translated throughout the dough. Thus, at the beginning of the day the temperature of the stainless steel bowl might be room temperature and through the environmental factors, such as the operation of the ovens and the British Thermal Units, "BTUs" imparted during mixing operations, the core temperature of the bowl increases throughout the day and transfers the heat to the dough.

Currently, mass production of dough is done at one location in large, industrial facilities. The benefit of a singular location is that environmental conditions can be monitored and controlled by use of sensors such as thermostats, flush out, and the like. Thus, the heating/cooling system of the room is used to help control the temperature of the dough. Furthermore, current containers used in mass dough production systems are large enough to be equipped with cooling jackets. Cooling jackets run cold water throughout the outer surface of the bowl to keep the bowl at a desired temperature. The operation of cooling jackets further increase the cost of manufacturing dough. Other practices in the art for controlling the temperature of the dough include the introduction of ice particles or of chilled or cold or warm water at prescribed temperatures.

Accordingly, it remains desirable to have a mass dough preparing machine that is adaptable to the temperature changes in a room without having to incur the expense of operating the heating/cooling system of the room. Furthermore, it remains desirable to have a dough preparing machine that does not utilize the current large containers, but can make dough in selectable, discrete and customizable batches.

SUMMARY OF THE INVENTION AND ADVANTAGES

Accordingly, the present invention provides a machine and method operable to mass produce batches of dough in selectable, discrete and customizable batches while controlling the temperature of the dough under varying environmental conditions without the cost of operating cooling jackets or maintaining consistent ambient conditions. Specifically, the machine and method varies the temperature of the water introduced into a batch of dough in order to make a batch of dough having a predetermined temperature and a desired tactile property. The temperature of the water is determined by maintaining an energy balance between the bowl, the dry ingredients, and the thermal energy imparted by mixing operations utilizing the first law of thermodynamics. Thus water temperature is varied batch by batch to produce a batch of dough having a consistent, predetermined temperature.

The machine includes a bowl for containing dough ingredients, a water source operable to selectively introduce water with the dough ingredients, a controller, and a water temperature controlling apparatus. The water temperature controlling apparatus is in communication with the water source and the controller. The controller is operable to actuate the water temperature controlling apparatus to change the temperature of the water introduced into the bowl so as to form a batch of dough having a predetermined temperature.

A method for producing a batch of dough having a predetermined temperature is also provided. The method includes the step of providing a bowl, introducing dough ingredients into the bowl, monitoring the temperature of the bowl, and providing a water source for introducing water into the bowl. The temperature of the water may be adjusted to a temperature necessary to produce a batch of dough at the predetermined temperature.

BRIEF DESCRIPTION OF THE DRAWINGS

FIG. 3 is a chart showing the correlation between the temperature of the bowl and the temperature of the water for a dough machine producing a specific batch of dough over a period of time; and FIG. 4 is a diagram showing the steps of a method for producing a batch of dough having a predetermined temperature.

DETAILED DESCRIPTION OF THE INVENTION

Figure 1:
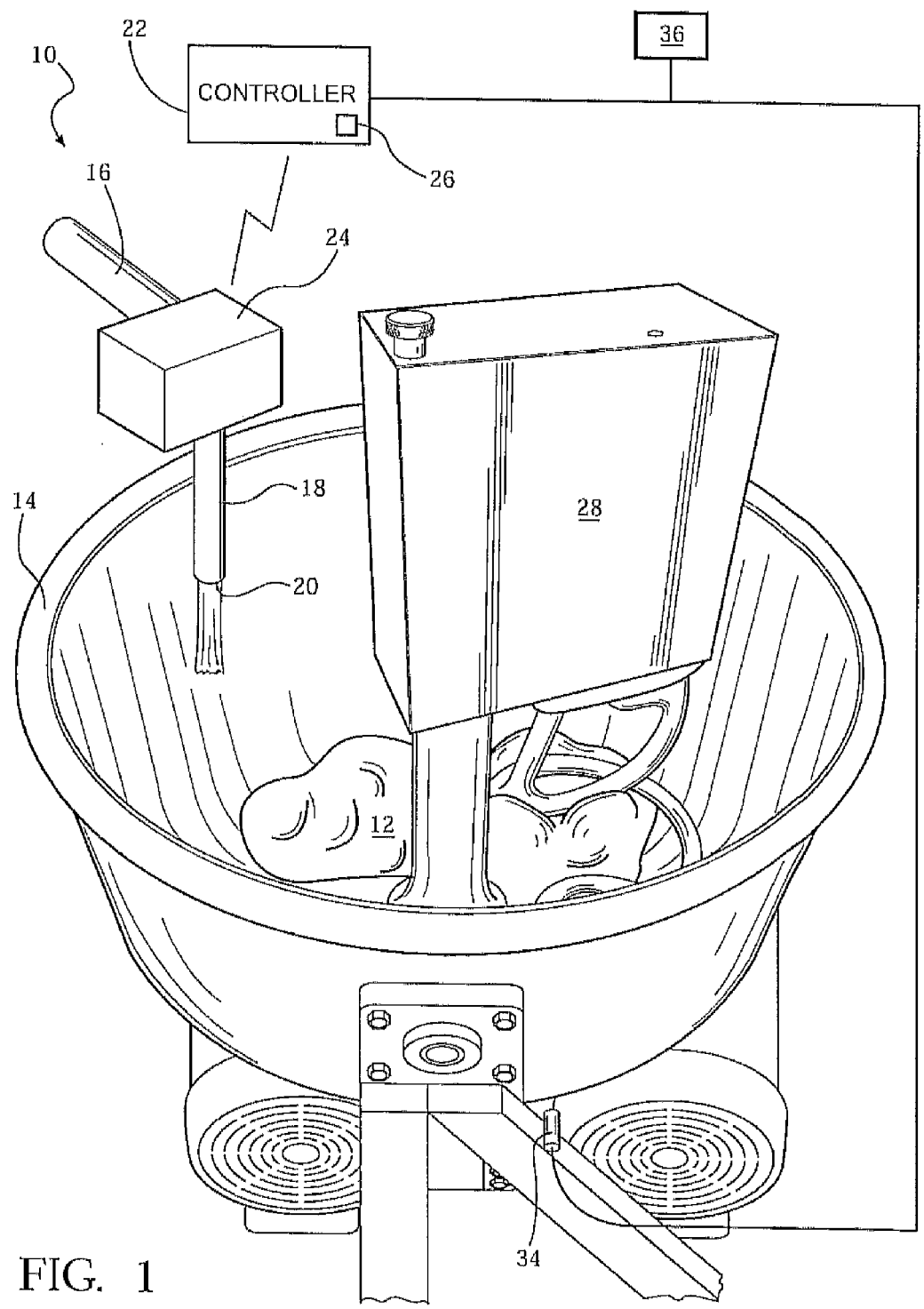
FIG. 1 is a perspective view of the first preferred embodiment of a machine for preparing a batch of dough having a predetermined temperature.
Figure 2:
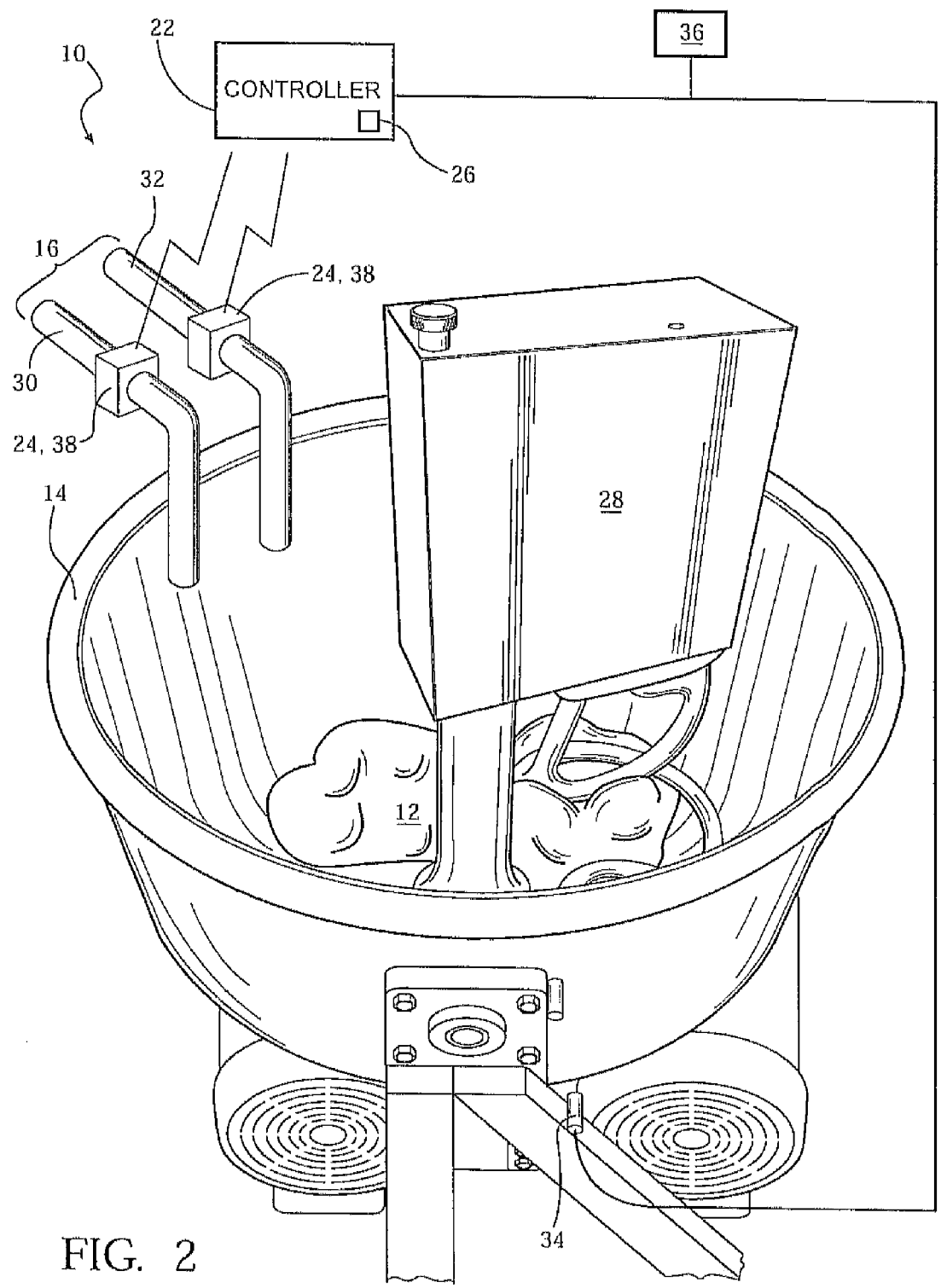
FIG. 2 is a perspective view of the second preferred embodiment of the machine for preparing a batch of dough having a predetermined temperature.

With reference to FIGS. 1 and 2, a machine 10 for preparing a batch of dough 12 at a predetermined temperature is provided. The batch of dough 12 is formed from various ingredients. These ingredients may be classified into dry and wet ingredients. Dry ingredients include ingredients such as flour, rye, salt, yeast and the like. Wet ingredients include ingredients such as oils, butter, slurries with bacteria, water, and the like. It is understood by those skilled in the art that the ingredients will vary depending on the batch of dough 12 desired to be produced.

The machine 10 includes a bowl 14 for containing the dough 12 ingredients. The bowl 14 may be formed out of a durable material such as stainless steel, aluminum, or a polymer composite. The bowl 14 is configured to hold dough 12 for making a discrete amount of bread. For instance, the bowl 14 may be 16 inches in diameter by 12 inches deep so as to produce a batch of dough 12 making twelve loaves of bread. The machine 10 includes a water source 16 operable to selectively introduce water as an ingredient for mixing with the other dough 12 ingredients. The water source 16 may include an elongated hose 18 having an opening 20 in communication with the interior of the bowl 14.

The machine 10 further includes a controller 22 and a water temperature controlling apparatus 24. The controller 22 is in communication with the water source 16 and the bowl 14. Specifically, the controller 22 is operable to detect the temperature of the bowl 14 and the dry ingredients. The water temperature controlling apparatus 24 is in communication with the controller 22 as well as the water source 16. The controller 22 actuates the water temperature controlling apparatus 24 to change the temperature of water introduced into the bowl 14 so as to form a batch of dough 12 having a predetermined temperature.

For instance, a recipe for making sourdough bread may include ten pounds of dry ingredients, and six pounds of water. For illustrative purposes, assume that the optimal temperature for a batch of sourdough bread is 78 degrees Fahrenheit, and that the bowl 14 has a temperature of 84 degrees Fahrenheit. The bowl 14 temperature may be the result of the environmental conditions such as the temperature and humidity of the room and the BTUs (British Thermal Unit) imparted onto the bowl 14 from prior mixing operations. Thus, in a room where an oven has been operating for an extended period of time, the temperature of the bowl 14 may even increase to 88 degrees Fahrenheit. Accordingly, as the dough 12 ingredients are introduced and mixed within the bowl 14, the temperature of the batch of dough 12 may increase beyond optimal temperature for yeast reaction as a result of the transfer of heat between the bowl 14 and the batch of dough 12.

The controller 22 may be programmed with a plurality of recipes for dough 12. Each of the recipes may also include instructions such as mixing time, mixing rate, and the temperature of the dough 12 that is optimal for yeast reaction. The controller 22 may further include an executable program 26. The program 26 utilizes the principles of the first law of thermodynamics to calculate the water temperature necessary to ensure that the batch of dough 12 is formed at a specified temperature Fahrenheit. The calculation may be based upon the heat transfer from the bowl 14 to the batch of dough 12, the mass of the dough 12 ingredients, the temperature of the environment and the temperature of the bowl 14, and the heat generated by mixing operations.

The formation of each batch of dough 12 may be considered a closed system, meaning that there is an exchange of energy (heat and work) but not matter with the environment. The first law of thermodynamics states that energy is conserved. Thus, increase in the internal energy of a system is equal to the amount of energy added by heating the system minus the amount lost as a result of the work done by the system on its surroundings. In the case of dough 12 manufacturing, the work done by the machine 10 on its surroundings is negligible. Accordingly, the internal energy of the system, i.e. the internal energy of the batch of dough 12 is a result of the heat added to the dough 12. This relationship can be expressed in the equation: $Q_{final}=Q_b+Q_d+Q_m+Q_w$, where $Q_b$ is the heat of the bowl 14, $Q_d$ is the heat of the dry ingredients 12, $Q_m$ is the heat generated by the mixer 28, $Q_w$ is the heat of the water, and $Q_{final}$ is the heat of the batch of dough 12.

In the instant case, the heat of the bowl 14, dry ingredients 12, and heat generated by the mixer 28 can be calculated. Furthermore, the heat of the final batch of dough 12 is known. Thus, $Q_w$, the heat of the water for producing the batch of dough 12 can be calculated. The equation for heat is known and is expressed in the following: $Q=MC(\Delta T)$, where M is the mass of the body, C is the specific heat capacity of the body, and $\Delta T$ is the change in temperature of the body. Through this equation, it is possible to determine what the temperature of the water should be to form a batch of dough 12 having a desired final uniform body temperature.

For example equation $Q_w=Q_1+Q_2$, where $Q_1$ and $Q_2$ refer to heat from water originating from respective first and second inlets 30, 32, can be rewritten as follows:

$$M_w C \Delta T_w = (M_1 C \Delta T_1) + (M_2 C \Delta T_2)$$

where $M_w$ is the mass of the water called for by the recipe, $\Delta T_w$ is the change in temperature of $M_w$, $M_1$ and $M_2$ are the mass of water from respective first and second inlets 30, 32, and $\Delta T_1$ and $\Delta T_2$ are the change in temperature of water from respective first and second inlets 30, 32.

In a closed system, $\Delta T_w$ is zero, i.e there is no change in temperature of $M_w$. Thus, the above expression can be written as follows:

$$0=(M_1 C \Delta T_1)+(M_2 C \Delta T_2);$$

$$-(M_1 C \Delta T_1)=(M_2 C \Delta T_2)$$

and the amount of water from respective sources $M_1$, and $M_2$ may be calculated based upon the desired amount of water called for by the recipe, the calculated temperature at which the water needs to be for optimal dough production, and the temperature of the water from the different sources.

For example, assume that based upon the first law of thermodynamics, the controller 22 calculates that the one gallon of water called for by the recipe needs to be at 50° F. Using the above equation, the amount of water from respective first and second inlets 30, 32 may be calculated when the temperature from respective first and second inlets 30, 32 are known. For illustrative purposes, assume that the water temperature from the first inlet 30 is 70° F., and the water temperature from the second inlet 32 is 33° F.

$$-(M_1 C \Delta T_1)=(M_2 C \Delta T_2)$$

$$-M_1(50° \text{ F.}-70° \text{ F.})=(3 \text{ gal}-M_1)(50° \text{ F.}-33° \text{ F.})$$

$$M_1=1.38 \text{ gal}; M_2=1.62 \text{ gal}$$

In other words, the amount of heat supplied by the bowl 14, the dry ingredients and the mixing operations must be reduced by a certain temperature to achieve a batch of dough 12 having a temperature optimal for dough formation. The controller 22 may also take into account other factors affecting heat transfer such as the prescribed mixing time that is necessary to mix the dough 12 to a predetermined consistency, the rate of revolution of the mixer 28, thermal conductivity of the bowl 14 and mass of dough 12, and the like.

With reference now to FIG. 1, a first preferred embodiment of the machine 10 is provided. The machine 10 includes a mixer 28 operable to mix the water with the dough 12 ingredients and a first sensor 34 in communication with the bowl 14 and the controller 22. The first sensor 34 is operable to detect the temperature of the bowl 14 and communicate the temperature of the bowl 14 to the controller 22. The controller 22 is operable to process the temperature of the bowl 14, the dry ingredients and actuate the water temperature controlling apparatus 24 to change the temperature of the water introduced into the batch so as to produce a batch of dough 12 having the predetermined temperature. Preferably the first sensor 34 is an infrared sensor. The infrared sensor is in communication with the bowl 14 and the controller 22 and is operable to detect the temperature of the bowl 14. Any infrared sensor currently known and used in the art is adaptable for use herein. The machine 10 may further include a second sensor 36 in communication with the controller 22. The second sensor 36 is in communication with the dough ingredients and the controller 22. The second sensor 36 is operable to detect the temperature of the dough ingredients. The second sensor 36 transmits the temperature of the dry dough ingredients to the controller 22.

The second sensor 36 may be further operable to detect environmental conditions such as the temperature of the room or the humidity in the room to determine the optimal temperature of water introduced as an ingredient that is necessary to produce the dough 12 at the desired temperature. The machine is further operable to produce dough having a predetermined consistency so as to facilitate dough handling. It is known that the tactile property of dough varies with the humidity of the environment. For instance, dough becomes sticky and hard to handle when exposed in a relatively humid room. Accordingly, the controller is operable to process environmental factors such as humidity to also calculate the quantity of water introduced in the bowl 14 to not only produce a batch of dough having the predetermined temperature, but also having a desired tactile property.

The water source 16 may have a first inlet 30 and a second inlet 32. The first inlet 30 provides water at room temperature. The room temperature of water is generally known to range between 66-77 degrees Fahrenheit. The second inlet 32 provides water that is chilled. The water may be chilled to 33 degrees Fahrenheit. The controller 22 calculates the temperature of the water introduce to the dough 12 ingredients having a temperature necessary to produce a batch of dough 12 having the predetermined temperature. The calculation is made by applying the first law of thermodynamics to the factors described above. Once the calculation is complete, the controller 22 actuates the water temperature controlling apparatus 24 to selectively actuate the first and second inlets 30, 32 so as to proportion the water from each inlet in order to achieve the calculated temperature.

For illustrative purposes an explanation of the operation of the machine 10 is provided using the example of the batch of sourdough above. Assuming that the controller 22 calculates that the one gallon of water needs to be at 50 degrees Fahrenheit in order to produce a batch of sourdough bread having a uniform body temperature of 78 degrees Fahrenheit. The controller 22 actuates the water temperature controlling apparatus 24 so as to adjust the temperature of the water to 50 degrees Fahrenheit. The water may then be introduced into the bowl 14 and mixed with the remaining ingredients to make a batch of sourdough bread having a uniform body temperature of 78 degrees Fahrenheit.

The machine 10 may factor other variables to determine the proper water temperature necessary to produce a batch of dough 12 having the desired temperature. For instance, the controller 22 may be in communication with the mixer 28 and may be operable to determine the amount of heat generated by the mixer 28 during mixing operations. The controller 22 processes the amount of heat generated by the mixer 28 to adjust the water temperature controlling apparatus 24. More specifically, the controller 22 takes into account the heat generated by the mixer 28 so as to calculate the temperature of the water that is needed to produce dough 12 at a desired temperature. The controller 22 then actuates the water temperature controlling apparatus 24 to control the first and second inlets 30, 32 and produce water at the calculated temperature. The controller 22 may determine the heat generated by the mixer 28 by processing the duration of the mixing cycle required for the desired batch of dough 12, and the cyclic rate at which the mixer 28 is operating. Alternatively, BTUs may be calculated empirically based upon the operating time of a mixer and the cyclic and programmed into the controller 22.

Such information may be processed along with the mass of the dough ingredients, the water in the bowl 14, and the temperature of the bowl 14.

The first and second inlets 30, 32 may include valves 38 which are operable to control the introduction of water. Preferably the valves 38 are configured to provide precise amounts of water at a controlled pressure. The controller 22 is in communication with the valves 38 and is operable to actuate the valves 38 so as to introduce a predetermined amount of water into the bowl 14.

With reference now to FIG. 2, a second preferred embodiment of the machine 10 is provided. In the second preferred embodiment the first and second inlets 30, 32 provide water at a generally fixed temperature. The valves 38 serve as the water temperature controlling apparatus 24. Specifically, the valves 38 proportion the amount of water from respective first and second inlets 30, 32 so as to deliver and introduce into the bowl 14 the water at the calculated temperature necessary to produce dough 12 at the desired temperature. In operation, the controller 22 actuates the valves 38 so as to provide a calculated amount of water from the first inlet 30 with a calculated amount of water from the second inlet 32 so as to produce one gallon of water at a temperature calculated to produce a batch of sourdough having a uniform body temperature optimal for yeast reaction.

With reference now to FIG. 3, a third preferred embodiment of the machine 10 is provided. In the third preferred embodiment, the machine 10 automatically lowers the temperature of water being introduced in predetermined increments. The predetermined increments may be based upon the incremental temperature increase of the bowl 14 and dry ingredients. The controller 22 further includes a chart 40 and the machine 10 is configured to manufacture only one type of dough 12 throughout the day. In such an operation the temperature of the bowl 14 can be forecasted as the mass and volume of the batch of dough 12, and the operation of the mixer 28 remains constant. As the temperature of the bowl 14 increases, the temperature of the water may then be decreased accordingly as shown in FIG. 3.

With reference now to FIG. 4, a method for producing a batch of dough 12 having a predetermined temperature is provided. The method includes the steps of providing a bowl 14, introducing dry dough ingredients into the bowl 14, monitoring the temperature of the bowl 14 and dry dough ingredients, and providing a water source 16 for introducing water at a temperature necessary to produce a batch of dough 12 at a desired temperature. The method may further include the step of providing a mixer 28 operable to mix the dough 12 ingredients and the water and measuring the heat generated by the mixer 28 to calculate the temperature of water introduced into the batch so as to ensure that the batch of dough 12 is formed at a desired temperature.

The heat from the bowl may be measured with a first sensor 34. The first sensor 34 is in communication with the bowl 14 and is operable to detect the temperature of the bowl 14. The heat generated by the mixer 28 may be calculated based upon the rate of rotation, and the duration of operation. The temperature of the dry ingredients may be monitored using a second sensor 36. The temperature of the bowl 14, heat generated by the mixer 28, may be used to calculate a water temperature operable to produce a batch of dough having a predetermined temperature.

The water source 16 may be a first inlet 30 operable to selectively introduce tap water and a second inlet 32 operable to introduce chilled water. The first and second inlets 30, 32 are actuated so as to introduce water having a temperature necessary to produce a batch of dough 12 at the desired temperature. More specifically, the amount of water from the first and second inlets 30, 32 is proportioned so as to deliver the necessary amount of water called for by the ingredient at a temperature that when mixed with the other ingredients produces a batch of dough 12 at the desired temperature.

The method may further include the steps of providing a controller 22 and a water temperature controlling apparatus 24. The controller 22 is in communication with the water temperature controlling apparatus 24 and the sensor. The sensor provides the controller 22 with the temperature of the bowl 14, and the controller 22 actuates the water temperature controlling apparatus 24 to change the temperature of the water introduced with the ingredients so as to produce a batch of dough 12 having the desired temperature. The method can further include the step of monitoring the environment to determine the proper temperature of water introduced with the dough 12 ingredients. Such environmental conditions can be the temperature of the room and the humidity of the room.

We claim:

1. A machine for controlling the temperature of dough, the machine operable to mix a plurality of ingredients together with water to form a batch of dough, the machine comprising:
    a bowl for containing the ingredients;
    a controller configured to receive the temperature of the bowl and the temperature of the batch of dough;
    a water source operable to selectively introduce water with the ingredients;
    a mixer operable to mix the water with the ingredients to form the batch of dough, the controller in communication with the mixer and configured to determine the amount of heat generated by the mixer during mixing operations;
    a water temperature controlling apparatus in operatively connected to the water source, the controller further configured to actuate the water temperature controlling apparatus, the water temperature controlling apparatus configured to change the temperature of water introduced into the bowl, the controller processing the amount of heat generated by the mixer, the temperature of the bowl, and the temperature of the batch of dough to provide water to the bowl at a predetermined temperature, the controller further adjusting the water temperature controlling apparatus in response to the heat generated by the mixer, the temperature of the dough, and the temperature of the bowl to maintain the predetermined temperature so as to form a batch of dough having a desired consistency.

2. The machine as set forth in claim 1, further including a first sensor in communication with the bowl and the controller, the first sensor operable to detect the temperature of the bowl and communicate the temperature of the bowl to the controller, and the controller operable to process the temperature of the bowl and actuate the water temperature controlling apparatus so as to change the temperature of the water introduced and produce a batch of dough having the predetermined temperature.

3. The machine as set forth in claim 2, further including a second sensor operable to detect the temperature of the ingredients and communicate the temperature of the ingredients to the controller, and the controller operable to process the temperature of the bowl, the ingredients, and actuate the water temperature controlling apparatus so as to change the temperature of the water introduced and produce a batch of dough having the predetermined temperature.

4. The machine as set forth in claim 3, wherein the ingredients are dry ingredients.

5. The machine as set forth in claim 3, wherein the second sensor is further operable to detect environmental conditions, the controller processing the environmental conditions and actuating the water controlling apparatus so as to change the temperature of the water to produce the dough at the predetermined temperature.

6. The machine as set forth in claim 5, wherein the second sensor is operable to detect the humidity of the environment.

7. The machine as set forth in claim 5, wherein the controller is further operable to process the humidity so as to calculate a quantity of water operable to produce a batch of dough have a desired tactile property.

8. The machine as set forth in claim 2, wherein the first sensor is an infrared sensor.

9. The machine as set forth in claim 2, wherein the water source includes a first inlet and a second inlet, the first inlet providing water at room temperature and the second inlet providing chilled water, and the water temperature controlling apparatus is operable to selectively actuate the first and second inlets so as to introduce water to the ingredients and produce a batch of dough having the predetermined temperature.

10. The machine as set forth in claim 1, wherein the controller processes the mass of the water, the ingredients, and the bowl, the controller further processes the temperature of the bowl so as to determine the temperature of water necessary to produce dough at the predetermined temperature, and the controller actuating the water controlling apparatus so as to change the temperature of the water to produce the dough at the predetermined temperature.

11. The machine as set forth in claim 1 further including a valve operable to control the output of water from the water source, the controller in communication with the valve and operable to actuate the valve so as to introduce a predetermined amount of water into the bowl.

12. The machine as set forth in claim 5, wherein the second sensor is operable to detect the temperature of the environment.

13. The machine as set forth in claim 1, wherein the controller has an executable program, the executable program having a chart, the chart providing the temperature of water for each batch of dough produced based upon the projected temperature of the bowl over a given period time.

14. A method for producing a batch of dough having a predetermined temperature, the method comprising the steps of:
    providing a bowl;
    introducing dough ingredients into the bowl;
    monitoring the temperature of the bowl;
    providing a water source operable to introduce water having a calculated temperature into the bowl;
    and determining the temperature of the dough ingredients, and processing the temperature of the dough ingredients, bowl, and heat generated by the mixer so as to calculate the temperature of water necessary to produce a batch of dough at the predetermined temperature; and
    mixing the water having the calculated temperature with the dough ingredients so as to produce a batch of dough at the predetermined temperature; and
    mixing the water having the calculated temperature with the dough ingredients so as to produce a batch of dough at the predetermined temperature.

15. The method as set forth in claim 14, further including the steps of providing a mixer operable to mix the dough ingredients and the water, and calculating the heat generated by mixer to determine the temperature of water introduced into the next batch of dough necessary to produce the next batch of dough at the predetermined temperature.

16. The method as set forth in claim 14, further including the steps of providing a sensor operable to detect the temperature of the bowl.

17. The method as set forth in claim 14, wherein the water source is a first inlet operable to selectively introduce water having a first temperature and a second inlet operable to selectively introduce water having a second temperature.

18. The method as set forth in claim 14, wherein the first inlet introduces chilled water, and a second inlet introduces water having a room temperature, and wherein the first inlet and second inlet are selectively actuated so as to introduce water having a temperature necessary to produce a batch of dough at the predetermined temperature.

19. The method as set forth in claim 14, further including the steps of providing a controller and a water temperature controlling apparatus, the controller in communication with the water temperature controlling apparatus and the sensor, the sensor providing the controller with the temperature of the bowl, and the controller actuating the water temperature controlling apparatus to change the temperature of the water introduced with the dough ingredients so as to produce a batch of dough having a predetermined temperature.

20. The method as set forth in claim 14, further including the step of monitoring the environment to determine the temperature of the water introduced with the dough ingredients needed to produce a batch of dough having the predetermined temperature.

21. The method as set forth in claim 20, wherein the temperature and humidity of the environment are used to determine the temperature of the water introduced with the dough ingredients needed to produce a batch of dough having the predetermined temperature.

22. The method as set forth in claim 20, wherein the temperature and humidity of the environment are used to determine the quantity of the water introduced with the dough ingredients so as to produce a batch of dough having a desired tactile property.

\* \* \* \* \*